(12) United States Patent
Gregor et al.

(10) Patent No.: US 7,842,258 B2
(45) Date of Patent: Nov. 30, 2010

(54) SECONDARY CONTAINMENT FOR A PERFORATED PLATE

(75) Inventors: Joseph H. Gregor, Itasca, IL (US); Michael J. Vetter, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 893 days.

(21) Appl. No.: 11/683,510

(22) Filed: Mar. 8, 2007

(65) Prior Publication Data
US 2008/0219898 A1    Sep. 11, 2008

(51) Int. Cl.
*B01J 8/12* (2006.01)
*B01J 8/44* (2006.01)

(52) U.S. Cl. .............. 422/220; 422/216; 422/239; 422/311

(58) Field of Classification Search .......... None
See application file for complete search history.

(56) References Cited

U.S. PATENT DOCUMENTS

| | | | |
|---|---|---|---|
| 5,209,908 A | 5/1993 | Koves et al. | 422/218 |
| 5,356,462 A * | 10/1994 | Bruggendick | 96/150 |
| 5,366,704 A | 11/1994 | Koves et al. | 422/218 |
| 6,059,961 A | 5/2000 | Koves et al. | 208/146 |
| 6,224,838 B1 | 5/2001 | Schulz et al. | 422/218 |
| 7,621,988 B1 * | 11/2009 | Sun et al. | 96/152 |

* cited by examiner

*Primary Examiner*—Jennifer A Leung
(74) *Attorney, Agent, or Firm*—Mark Goldberg

(57) ABSTRACT

A secondary containment system is used with a screenless reactor. The secondary containment system includes a screen sized to prevent the passage of catalyst particles, and is affixed to the screenless reactor with supports to hold the screen a desired distance from the reactor.

1 Claim, 3 Drawing Sheets

SECONDARY CONTAINMENT FOR A PERFORATED PLATE

FIELD OF THE INVENTION

This invention relates to the field of fluid particle contact and to an apparatus for contacting fluids and particles. More specifically, this invention relates to a moving bed of particles with a cross-flowing fluid.

BACKGROUND OF THE INVENTION

A wide variety of processes use radial flow reactors to provide for contact between a fluid and a solid. In a reactor, the solid usually comprises a catalytic material on which the fluid reacts to form a product. In an adsorber, the solid usually comprises a solid adsorbent for removing one or more components from a fluid stream. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst, or adsorbent, beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes used to hold the catalyst particles within a bed are sized to have apertures sufficiently small that the particles cannot pass through. A significant problem is the corrosion of meshes or screens used to hold catalyst beds in place, or for the distribution of reactants through a reactor bed. Corrosion can plug apertures to a screen or mesh, creating dead volumes where fluid does not flow. Corrosion can also create larger apertures where the catalyst particles can then flow out of the catalyst bed with the fluid and be lost to the process increasing costs. This produces unacceptable losses of catalyst, and increases costs because of the need to add additional makeup catalyst. With the design of new reactor internals, the losses due to corrosion and plugging of screens are reduced, but potential losses of catalyst can occur during start-ups and during operational changes when temperatures and pressures in a system fluctuate greatly.

The design of reactor components can overcome catalyst losses can save significantly on downtime for repairs and the replacement of catalyst, which is a significant portion of the cost of processing hydrocarbons.

SUMMARY OF THE INVENTION

A screenless reactor solves many problems associated with corrosion and/or plugging of reactors. However, cooling and heating cycles during startup and shutdown present problems with catalyst passing through the screenless reactor. A secondary containment system provides for backup and recovery of the catalyst that can escape the reactor. The secondary containment system comprises a screen affixed to a screenless reactor partition by a plurality of standoff supports. In one embodiment, the invention comprises a screen having slots or spaces sized to less than 90% of the typical size of the catalyst particles in the reactor. In one embodiment, the screen can comprise a wire screen having a plurality of wires spaced apart at a distance less than 90% of the typical catalyst particle size in a substantially parallel configuration and mounted to supports for holding the screen a fixed standoff distance from the screenless reactor partition. In another embodiment, the screen can comprise a rigid partition having slots defined therein, wherein the slots are elongated and have a width of less than 90% of the typical catalyst particle size.

Other objects, advantages and applications of the present invention will become apparent to those skilled in the art from the following drawings and detailed description.

DETAILED DESCRIPTION OF THE INVENTION

Figure 1:
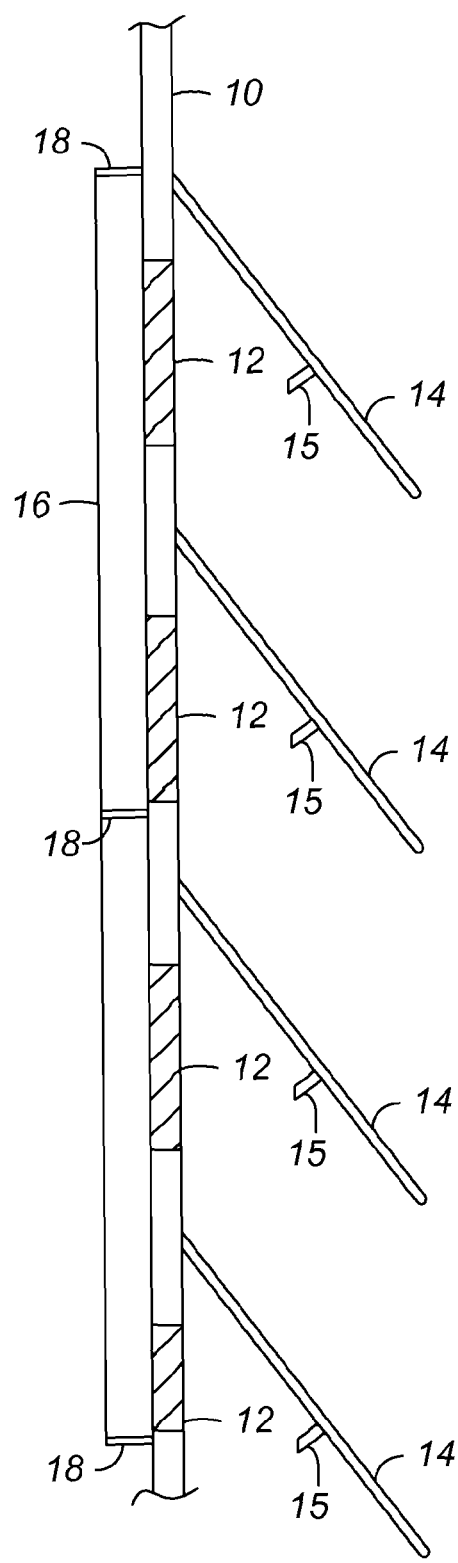
FIG. 1 shows a cross-section of a louvered screen with the standoff screen.

Currently, catalytic dehydrogenation processes use radial flow reactors. The reactors use a profile wire screen for the containment interface of the catalyst in the catalyst bed. The existing profile wire design has slots that are sized to contain catalyst pellets. Since catalyst pellets can be small, the slots are narrow and are susceptible to plugging and fouling. The screens also experience corrosion and erosion which can lead to failure in the containment of the catalyst. The loss of catalyst is expensive, and the replacement of the wire screen is both expensive and time consuming. The present invention is also applicable to an adsorber that has a bed of adsorbent particles flowing through the adsorber. The terms reactor and catalyst as used hereinafter can also be used to refer to an adsorber and adsorbent.

A louver screen design has been developed to reduce the sensitivity to fouling and plugging in cross-flow reactors and cross-flow adsorbers. The louver screen design relies on forward flow of incoming vapor feed flow through large holes in a perforated core component, or reactor partition, to maintain a stable catalyst free surface as the primary means of catalyst containment. Transient operating conditions create a potential for a reversal of vapor flow that would disturb and fluidize the catalyst free surface at the bottom of each louver. The disturbed/fluidized catalyst free surface would cause the catalyst solids to flow out of the large holes in the perforated core component and loss of the reactive radial catalyst bed containment.

Transient operating conditions include the heating up and cooling down of a reactor during periods where the process is not operating. The catalyst and the screenless reactor contract during a cooling down period and expand during a heating up period. As a result, some of the catalyst expands into the region under the louvers, and can spill over through the large holes in the reactor partition.

The present invention includes a secondary containment for a cross-flow reactor. A cross-flow reactor comprises an inlet partition and an outlet partition. Currently, in most cross-flow reactors, the partitions are screens that have small openings, sized to prevent the passage of solid catalyst particles. Due to drawbacks of the screen designs, screenless partitions have been developed. The screenless partitions comprise a wall having apertures defined therein, where the apertures are large relative to the size of catalyst particles. The partitions further include a plurality of louvers where the louvers form a cover over the apertures in the partitions, and prevent the flow of solid particles through the apertures, while allowing the flow of fluid that will contact the solid particles. The fluid for many reactors will be a gas. The louvers have an upper edge and a lower edge with the upper edge affixed to the partition at a position above an aperture, and the louver extends away from the partition at an angle between about 1 degree and 85 degrees. The lower edge of the louver is at a position at least as low as the lowest point of the aperture that the louver covers.

The secondary containment comprises a screen spaced from a partition, and is affixed to the partition by a plurality of standoff supports. A cross-section of the screenless partition with the secondary containment is shown in FIG. 1. The embodiment comprises the partition 10, having openings 12 defined therein. The openings 12 are covered by louvers 14, such that the downward flow of catalyst in the reactor will not permit the movement of catalyst through the openings 12, or apertures. Vanes 15 extend substantially perpendicularly from the louvers and are affixed to the underside of the louvers at a position between about 10% and 90% of the length of the louver. The screen 16 is affixed to the partition 10 with hydraulic standoffs 18. The hydraulic standoffs 18 are supports sized to hold the screen 16 away from the partition to a distance between about 0.5 cm (0.2 in.) and 2.0 cm (0.8 in.). The hydraulic standoffs 18 perform the function of holding an object in a position while allowing for a fluid to flow around or through the object. This is a spacing to allow for substantially uniform distribution of the fluid flow through the partition by aiding the pressure distribution over the surface of the partition 10.

Figure 2:
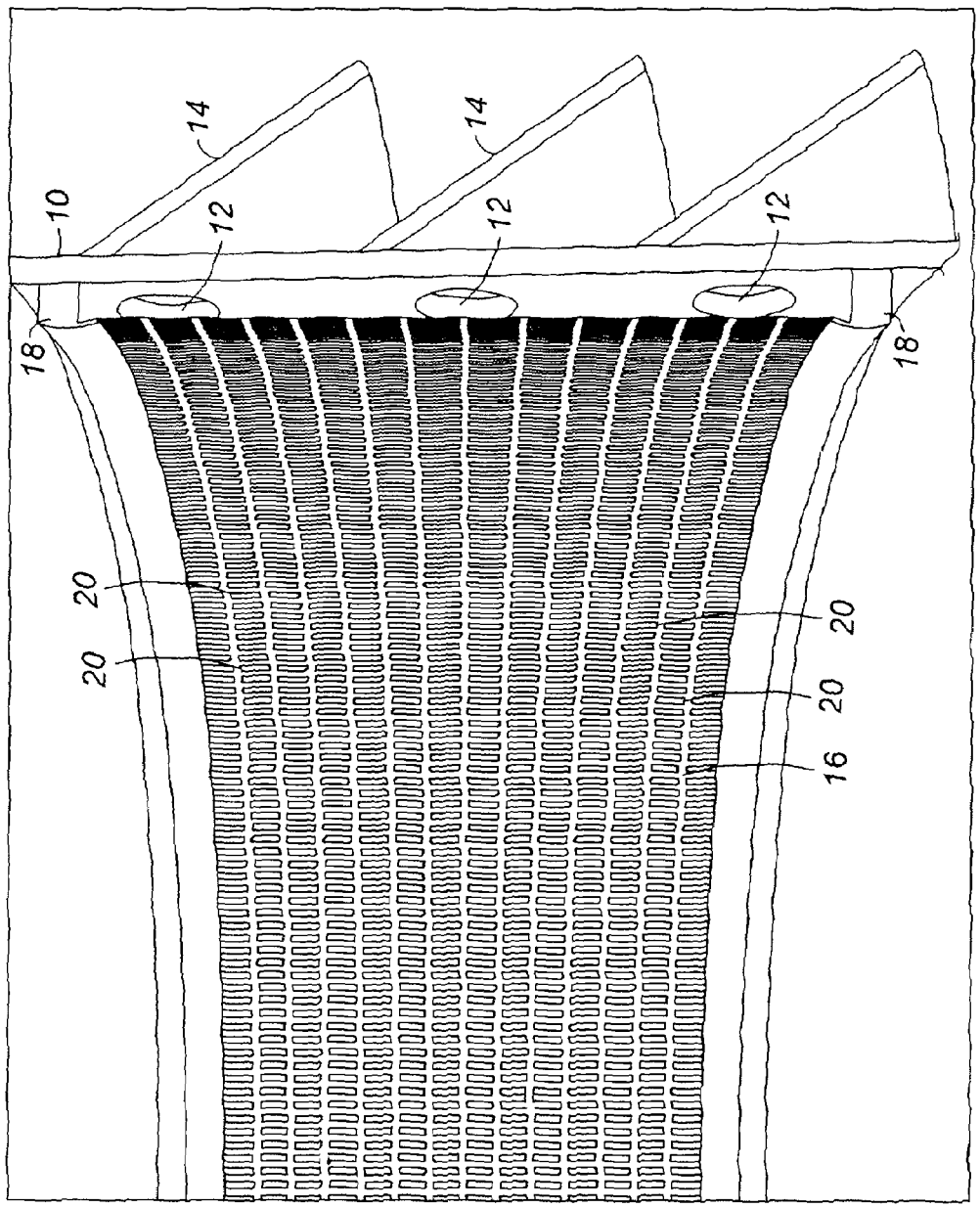
FIG. 2 shows a perspective of a section of the louvered screenless partition with the standoff screen.

A view of one embodiment is shown in FIG. 2. A section of a reactor partition 10 is shown with the secondary containment screen 16, and is from the inner section of a cylindrical reactor. The secondary screen 16 comprises slots sized to a width of about 90% the size of catalyst particles. The catalyst particles for a typical reactor are sized to be nominally 1/16 inch, or 0.16 cm, in diameter, and the spacing for the openings in the secondary screen is sized for about 0.15 cm. This will prevent the vast majority of any catalyst that happens to pass through the partition from exiting the reactor. The hydraulic standoffs 18 support the screen 16 and position the screen 16 at a substantially constant distance from the partition 10.

In one embodiment, the screenless partition is designed with the apertures arrayed in rows, with each row at a constant elevation, and with a louver covering the apertures in a row. The standoffs 18, comprise a continuous solid beam, that extends horizontally along the reactor partition 10, and is affixed to the partition 10, and each standoff is disposed at a position proximate to the lowermost point of the apertures 12 in a row. The screen 16 is affixed to the standoffs 18, and has slots 20 disposed between the standoffs 18. The solid standoffs 18 provide for a position where any catalyst that passes the partition 10 can be caught. During processing, the flow of fluid can carry catalyst particles back into the reactor through the apertures 12. This occurs with the turbulent flow of fluid that can move particles around and will carry them through the apertures 12 over the course of operation.

Figure 3:
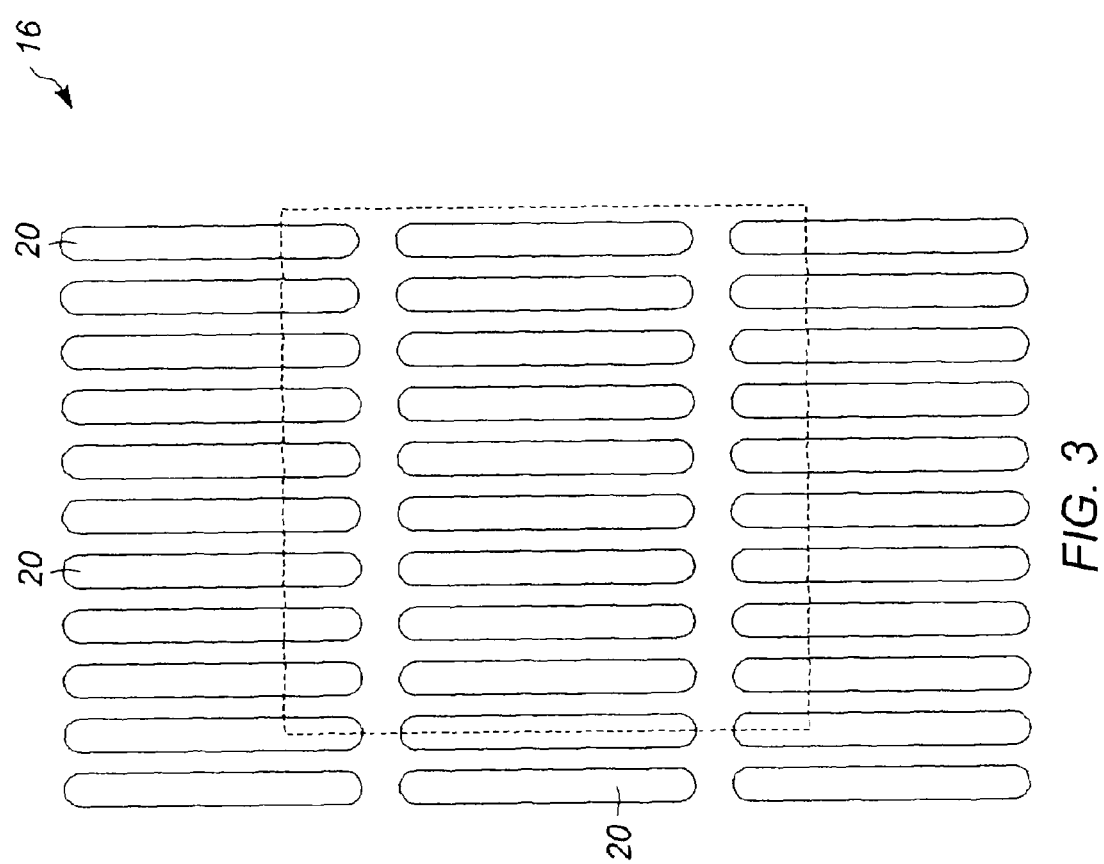
FIG. 3 shows a layout of one embodiment of the screen.

In one embodiment, the screen has an open area of between 20% and 75% with the open area preferably between 30% and 75%. For strength considerations of material chosen, one embodiment of the screen has an approximately 50% open area, as shown in FIG. 3. In this embodiment, the screen comprises slots 20 arranged in a uniform pattern and having an elongated oval shape with typical length of about 14 mm and a width of about 1.5 mm. The slots 2—are oriented such that the length is in a vertical direction and the width is in a horizontal direction. The slots 20 are separated horizontally by about a 1 mm separation and vertically by about a 3.6 mm separation.

The secondary screen can be of any makeup, including a perforated plate having holes less than 0.15 cm (0.06 in.). Optionally, the secondary screen can comprise wires spaced apart a distance of less than 0.015 cm (0.06 in.), or elongated slots having a width of less than 0.15 cm (0.06 in.). Preferable the screen comprises sufficient openings to provide free flow of fluid through the screen and to provide a substantially uniform pressure distribution over the apertures 20 in the partition 10.

One embodiment of the present invention is an improved reactor, wherein the reactor comprises a louvered partition 10 with apertures 12 defined therein. The louvers 14 are affixed on the partition 10 on the side that solid catalyst is contained and cover the apertures 12 such that solid particles flowing through the reactor will flow over the louvers 14, but not back through the apertures 12 in the partition 10. The louvers 14 extend away from the partition, into a particle retention volume of the reactor, at an angle between 1 degree and 85 degrees, and extend downward from the point where the louvers 14 are affixed to the partition 10. The reactor further includes a plurality of supports 18, or hydraulic standoffs, affixed to the partition 10 on the side opposite the side with the louvers 14. The reactor further includes a screen 16 affixed to the hydraulic supports 18, or standoffs, such that the screen 16 is disposed a distance from the partition 10 between about 0.2 cm. and 0.8 cm. The screen 16 has slots 20, or openings, sized to less than about 90% the size of catalyst particles in the reactor. The slots 20 are elongated openings having a width of less than about 0.15 cm (0.06 in.).

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus for the secondary containment of catalyst comprising:

a standoff screen having an open area, wherein the standoff screen is affixed to a screenless reactor partition by a plurality of standoff supports wherein the screenless reactor partition comprises:

a partition having apertures defined therein, wherein each aperture has an upper edge and a lower edge; and a plurality of louvers and wherein each louver has an upper edge and a lower edge and the louver is affixed to the partition at a position above the upper edge of an aperture, and extends away from the partition at an angle between about 1 degree and about 85 degrees, and where the louver lower edge extends to at least the lower edge of the aperture and wherein the louvers further comprise vanes extending substantially perpendicularly from the louvers, and affixed to the underside of the louvers at a position between about 10% and 90% of the length of the louver.

* * * * *